Dec. 10, 1963  R. W. LONG  3,113,391
LAND LEVELER
Filed Aug. 29, 1961  5 Sheets-Sheet 1
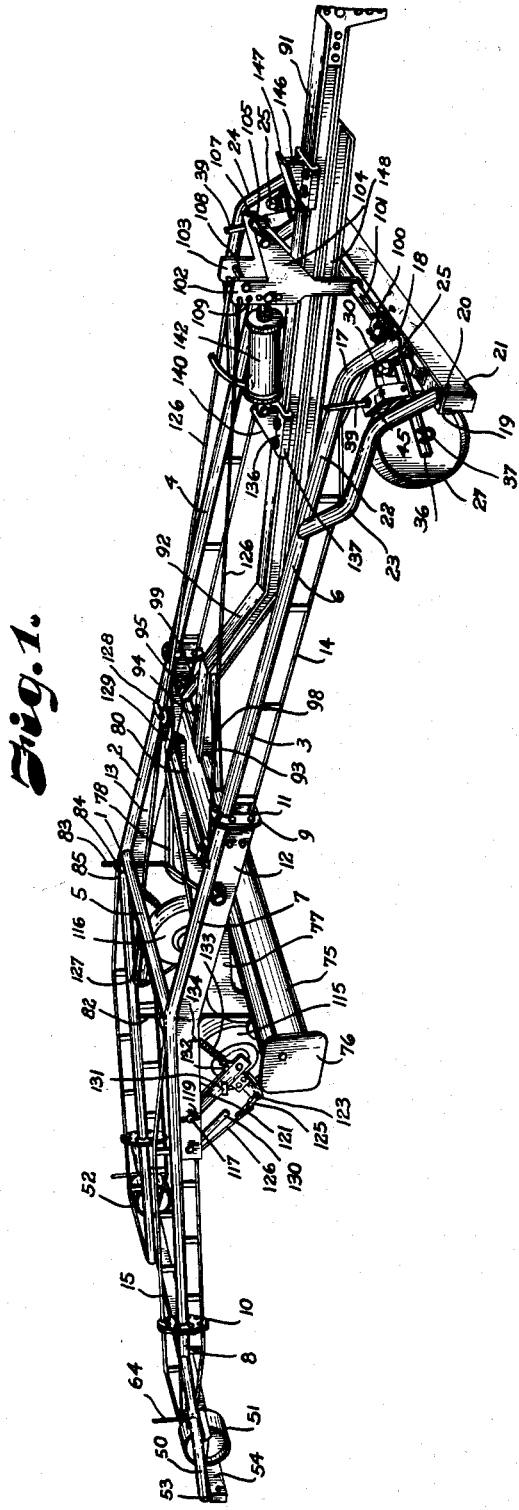
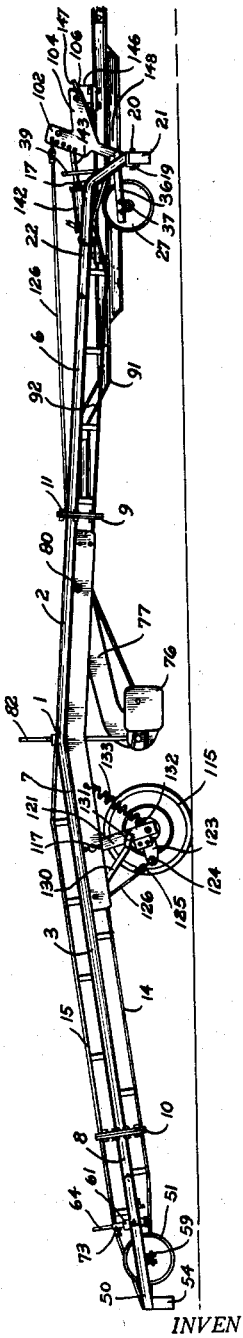
INVENTOR.
Ralph W. Long.
BY
ATTORNEYS.

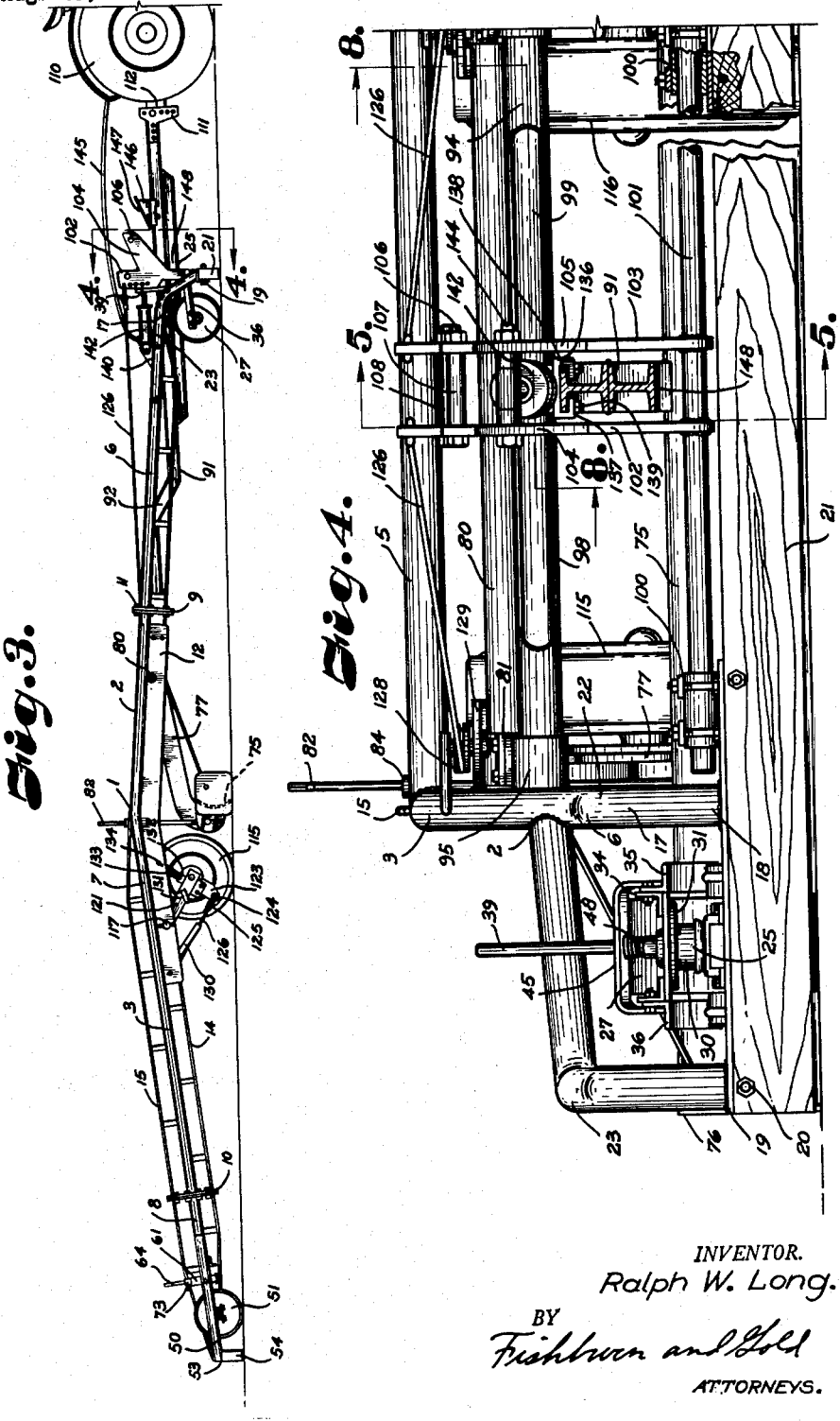

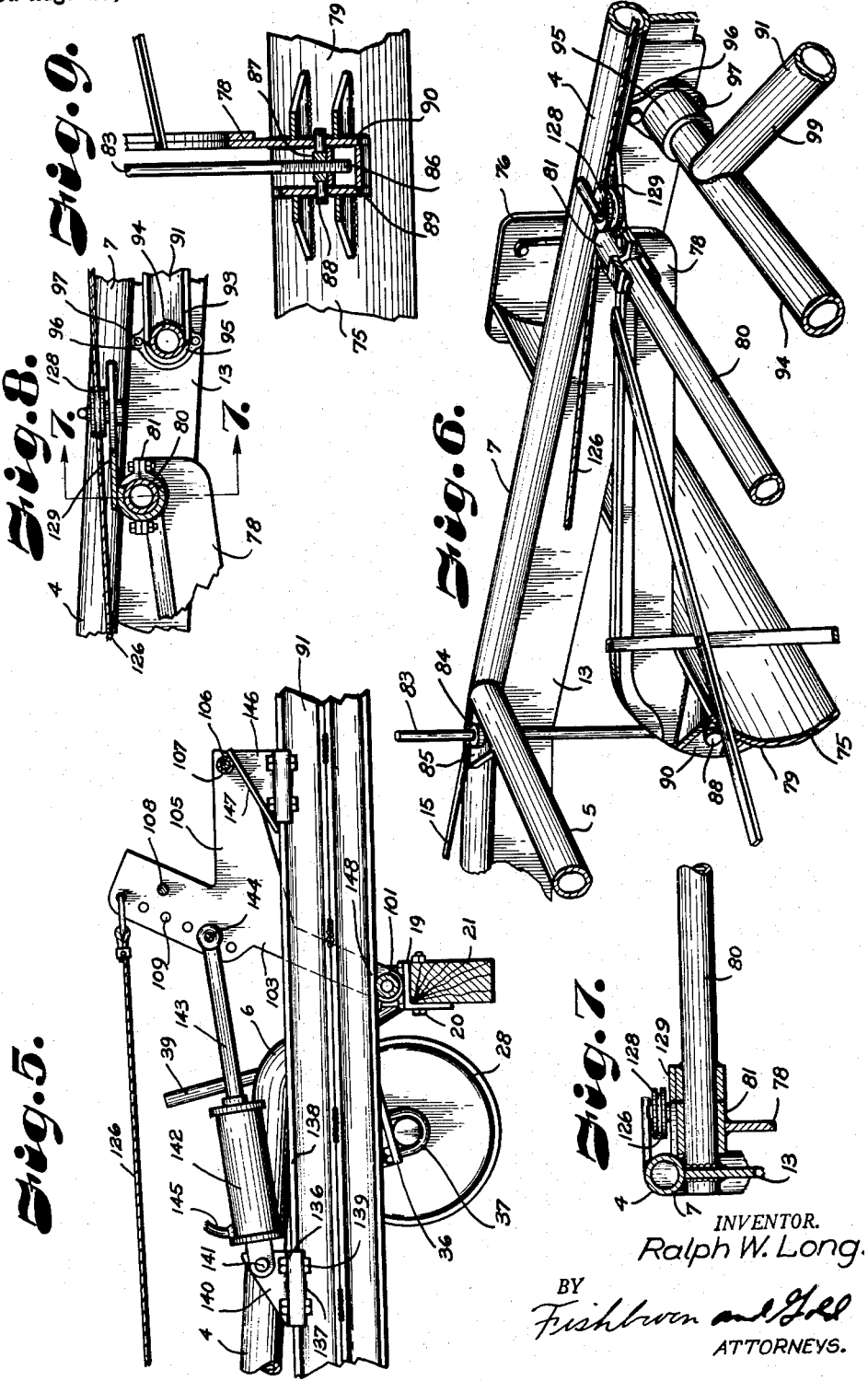

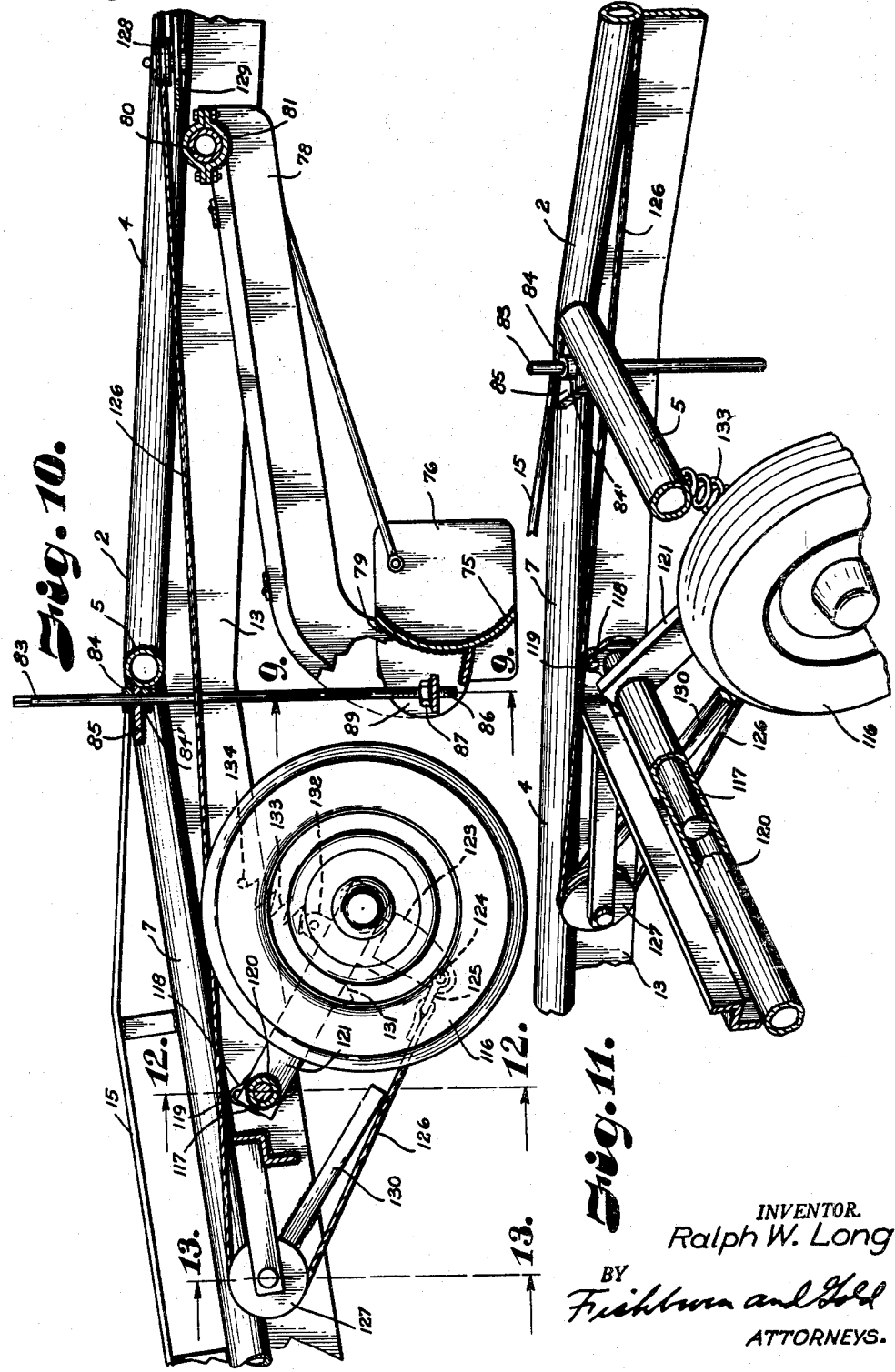

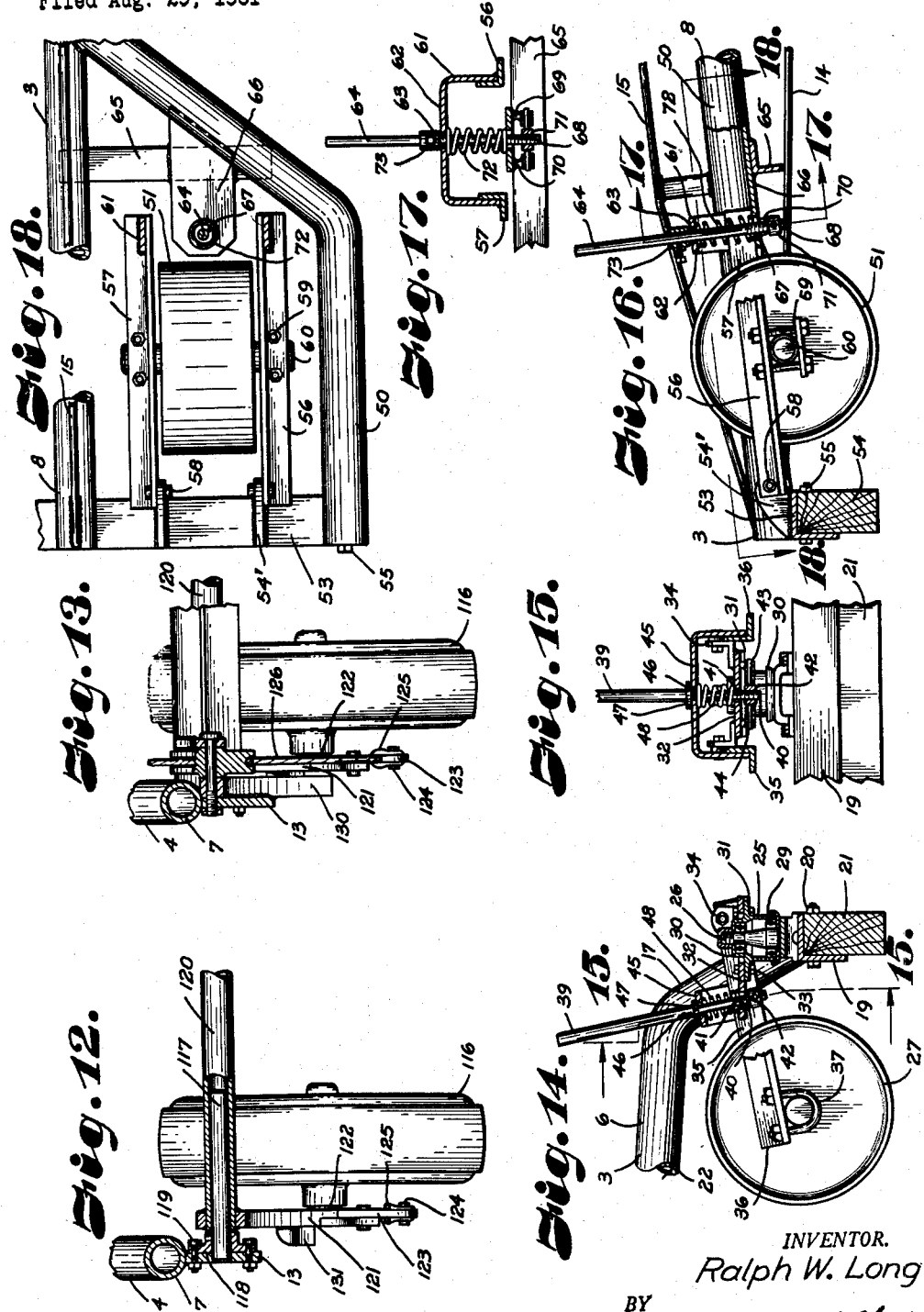

United States Patent Office 3,113,391
Patented Dec. 10, 1963

3,113,391
LAND LEVELER
Ralph W. Long, Rte. 3, McCune, Kans.
Filed Aug. 29, 1961, Ser. No. 134,704
7 Claims. (Cl. 37—176)

This invention relates to a land leveler for use in the agricultural field, in road construction and the like, and more particularly to a leveler of this type wherein the device is adapted to smooth the ground preparatory for planting or surfacing to provide a smooth surface therefor.

Heretofore, in devices of this character, the principal criticism has been that the land leveler proper being drawn by a tractor or the like makes it impossible to obtain a complete leveling of the ground due to the fact that the hitching element follows the tractor on uneven ground, thus causing the front end of the leveler to which the hitch is attached to follow the tractor rather than the ground.

It is, therefore, the principal object of the present invention to provide a land leveler of this type to be drawn by a tractor or the like and having a tongue mounted rearwardly of the front end of the leveler, and the forward portion of the tongue being movable vertically and independently of the front end of the leveler whereby when the tractor moves over uneven ground the leveler proper will not be disturbed in its travel.

Other objects of the present invention are to provide a land leveler which comprises an elongated frame having ground engaging bars or floats at their respective ends and an adjustable scraper unit at substantially the center of the leveler; to provide the front bar or float leveler with spaced wheels mounted for rotary movement and vertical adjustment and which travel behind the front leveling bars; to provide rear wheels in front of the rear leveling bar, also vertically adjustable with respect to the bar; to provide means for adjusting the depth of the dirt moving blade intermediate the ends of the leveler to adjust the scraper to the desired depths and maintain a substantially constant leveling position; to provide transporting wheels on the frame intermediate the ends thereof adjustable vertically for transporting the device; to provide hydraulic means for raising and lowering said transportation wheels when the device is to be transported; to provide said frame in sections whereby the sections may be disengaged from each other for loading and transportation if desired; to provide the tongue for attachment to the tractor with guide means at the forward end of the leveler to guide the tongue in a vertical position and leave it free for movement vertically without movement of the forward leveling bar; to provide a trackway on the tongue engageable by the vertical guide means on the forward end of the leveler whereby when the ground engaging wheels for transportation are lowered the tongue will be locked against the front ground engaging bar to hold the same in position during transportation; and to provide a device of this character simple and economical to manufacture.

In accomplishing these and other objects of the invention I have provided improved details of structure, the preferred forms of which are shown in the accompanying drawings wherein:

FIG. 1 is a perspective view of the land lever particularly illustrating the frame structure.

FIG. 2 is a side view of the land leveler shown in position for transportation.

FIG. 3 is a side view showing the apparatus attached to a tractor and in working position.

FIG. 4 is an enlarged partly cross-sectional view taken on a line 4—4, FIG. 3.

FIG. 5 is a sectional view taken on a line 5—5, FIG. 4.

FIG. 6 is an enlarged fragmentary perspective view particularly illustrating the mounting of the tongue and the mounting of the scraper element.

FIG. 7 is a sectional view taken on a line 7—7, FIG. 8, particularly illustrating the pulley for mounting the cable for lowering the transporting wheels.

FIG. 8 is a sectional view taken on a line 8—8, FIG. 4.

FIG. 9 is a sectional view taken on a line 9—9, FIG. 10.

FIG. 10 is an enlarged longitudinal sectional view particularly illustrating the mounting of the scraper.

FIG. 11 is an enlarged fragmentary perspective view particularly illustrating the mounting of the transporting wheels.

FIG. 12 is a sectional view taken on a line 12—12, FIG. 10.

FIG. 13 is a sectional view taken on a line 13—13, FIG. 10.

FIG. 14 is a sectional view particularly illustrating the mounting of the front wheels of the apparatus.

FIG. 15 is a cross-sectional view taken on a line 15—15, FIG. 14.

FIG. 16 is a sectional view particularly illustrating the mounting of the rear wheels of the apparatus.

FIG. 17 is a sectional view taken on a line 17—17, FIG. 16.

FIG. 18 is a longitudinal cross-sectional view taken on a line 18—18, FIG. 16.

Referring more in detail to the drawings:

1 designates a land leveler embodying the features of my invention which comprises a main frame 2 having side sections 3 and 4 here shown to be of tubular construction, although I do not wish to be limited to this particular construction as it is shown merely as illustrative. The side members 3 and 4 are angled upwardly from each end as best illustrated in FIG. 1 and are joined at substantially the center thereof by crossbar 5, and secured to the side members by welding or other suitable means. The frame consists of a forward section 6, an intermediate section 7 and a rear section 8, and the sections are joined together by mating flanges 9 and 10 welded to the side members 3 and 4, and secured together by bolts or the like 11. As these flanges to secure the sections together are identical only one is described. The purpose of making the frame in sections is for disassembly for transportation on a truck or the like if desired.

The center section is provided with elongated depending side members 12 and 13 and are secured to the tubular side members 3 and 4 by welding or the like. Strut rods 14 and 15 are provided and extend longitudinally underneath and partly above the side members 3 and 4 to the flange plates 9 and 10 for strengthening the side members, as is the usual practice. The respective ends of the strut rods are secured to the respective ends of the frame, also as is the usual practice.

The front ends of the side members 3 and 4 are angled downwardly as indicated at 17 and have their ends 18 welded or otherwise suitably secured to a cross member 19, here illustrated to be of angle shape having a depending flange, and secured thereto by bolts or the like 20 is a ground engaging leveling member or front float 21. The forward ends 22 of the frame portions 3 and 4 include side braces 23 and 24 to support the outer ends of the leveling bar 21. Mounted on the cross member 19 between the forward ends of the frames 3 and 4 and the braces 23 and 24 are gauge wheel mountings 25 including vertically extending spindles 26 (FIG. 14) for supporting gauge wheels 27 and 28. As the wheels and mountings are identical, only one will be described.

Mounted on the spindle 26 by bearings 29 is a hub 30 having an outwardly extending horizontal flange 31 to which a plate 32 is attached by bolts or the like 33 adapted to rotate with the hub 30 on spindle 26. Upwardly extending ears 34 are secured to plate 32 on the forward end thereof to pivotally connect rearwardly extending arms 35 and 36 for mounting of the gauge wheels 27 and 28 to said arms by U-bolts 37. The front wheels are therefore mounted for lateral rotary movement on the spindles for guiding of the forward end of the leveler.

Vertical adjustment of the wheels 27 and 28 with respect to the front leveling bar or float 21 is accomplished through a rod 39 having a threaded end 40 extending through an opening 41 in the plate 32 secured to the hub member as above described. The threaded end of the rod 39 engages in a nut 42 which is rotatably mounted as at 43 between ears 44 extending downwardly from the plate 32 (FIG. 15). Secured to the arms 35 and 36 forwardly of the wheels 27 and 28 and extending across the space defined by said arms is a U-shaped bracket 45 having an opening 46 in the top thereof through which the rod 39 extends. The rod is provided with a collar or shoulder 47 above the opening 46, and mounted on the rod between the bracket 45 and the plate 32 is a coil spring 48. By rotation of the rod 39 with an implement (not shown) the gauge wheels may be raised or lowered with respect to the ground engaging bar or float 21 to control the engagement of said bar or float with the ground. By this means the depth of the bar is adjusted as the unequal contour of the ground is encountered.

The rear ends of the side frames 3 and 4 are also provided with brace members 50 forming a well for mounting of rear gauge wheels 51 and 52. A cross bar 53 is secured by welding or other suitable means to the rear ends of the frame members 3 and 4 of frame section 8 as well as the rear ends of the brace member 50. The cross member 53 also is angle shaped and carries a ground engaging bar or float 54 secured thereto by bolt 55, as illustrated in the front ground engaging bar. Secured to the top of the crossbar 53 by welding or other suitable means are upstanding spaced lugs 54' to which are pivotally mounted angle-shaped bars or arms 56 and 57 by bolts or pins 58. Secured midway between the bars or arms 56 and 57 by U-bolts or the like 59 is a shaft 60 for mounting of the rear wheels 51 and 52. As the mounting of the rear wheels is identical, only one mounting will be described. The forward ends of the arms 56 and 57 are connected by U-shaped bracket 61 having a cross portion 62 provided with an opening 63 through which a rod 64 extends. A bracket 65 is secured between the frame and the brace members, and secured thereto by welding or other suitable means is a rearwardly extending plate 66 having an opening 67 for receiving the lower end 68 of the rod 64. The plate includes downwardly extending spaced ears 69 and 70, between which is pivotally mounted a nut 71 for receiving the threaded end 68 of the rod 64. A coil spring 72 extends between the plate 66 and the underside of the cross portion 62 of the bracket 65 on rod 64, and a collar 73 is adjustably secured to said rod above the bracket 61. By rotation of the rod 64 by tool (not shown) the rear wheels 51 and 52 are adjustable with respect to the crossbar 53 as described in connection with the front wheels.

A concave scraper blade 75 is provided underneath the frame intermediate the ends thereof and includes ends 76 to which the blade is rigidly secured by welding or other suitable means. The blade 75 is adjustable vertically and includes spaced arms 77 and 78 having their rear ends curved and welded to the rear 79 of the blade 75. The arms 77 and 78 extend forwardly and upwardly and have their forward ends rotatably secured to a shaft 80 by split collar 81, as best illustrated in FIG. 10. The shaft 80 is rigidly secured to the side members 12 and 13, as illustrated in FIG. 7, and the split collar is rotatable on the rod. The scraper blade 75 is adjustable vertically by rods 82 and 83 which are engaged by nuts 84 and set screws 84' on brackets 85 secured to the cross arm 5 and the side members 3 and 4, as best illustrated in FIG. 6. The lower ends 86 of the rods 82 and 83 are threaded opposite to the threads engaged by nuts 84 and extend into nuts 87 which are pivotally mounted as at 88 (FIG. 9) between a bracket 89 and the curved end 90 of the arms 77 and 78 on the rear 79 of blade 75. By turning of the rods 82 and 83 by tool (not shown) the blade 75 may be adjusted vertically with respect to the frame to accommodate the amount of dirt to be moved depending upon the contour of the ground after the forward bar 21 moves thereover.

A tongue 91 is provided for the leveler and comprises an H-beam construction, the forward end of which extends substantially forwardly of the front leveling bar 21 of the device and rearwardly between the side members 3 and 4, and has its rear end 93 welded or otherwise rigidly secured to a cross member 94 having its respective ends rotatably mounted in sleeves 95 secured to the inside of the side members 12 and 13 by flanges or the like 96 and bolts or rivets 97 so that the rear end of the tongue is rotatably mounted in the frame, and here illustrated to be slightly to the rear of the forward frame section and forwardly of the scraper blade 75. Side braces 98 and 99 are provided for the tongue and have their rear ends also rigidly secured to the cross member 94.

Rotatably mounted in spaced bearing brackets 100 inwardly of the forward ends 17 of the side members 3 and 4 is a shaft 101. Rigidly mounted on the shaft are upstanding spaced arms 102 and 103 having forwardly extending arms 104 and 105 connected by a shaft 106 for a roller 107. The upper ends of the arms 102 and 103 are also connected by a rod 108. Spaced from the rear edges of the upstanding arms 102 and 103 are a plurality of spaced openings 109, for a purpose later described. It will thus be see that the tongue is free to float vertically between the upstanding arms 102 and 103 and will not affect the operation of the leveling bar 21 or the scraper 75 when the tractor as indicated at 110 is moving over uneven ground. The tongue includes a clevis or hitch 111 for attachment to the draw bar 112 of the tractor.

For the purpose of transportation of the land leveler for short distances when not in use in the field I provide transport wheels 115 and 116 pivotally mounted on shafts 117 having their ends rigidly mounted to the side members 12 and 13 by flanges 118 and bolts 119 (FIG. 12). As the mounting of each wheel is the same only one will be described. The mounting includes a tubular member 120 rotatable on the shafts 117, and rigidly secured to the ends of the tubular member are forwardly extending arms 121 having axles 122 mounted on the forward ends for mounting the wheels 115 and 116 thereon. Rigidly secured to the forward ends of the arms are downwardly extending brackets 123 having openings in their lower ends for receiving pins 124 for pivotally mounting hooks or loops 125 to which are attached cables or the like 126 running over pulleys 127 mounted on the side members 12 and then forward over pulleys 128 secured to brackets 129 extending from the respective frame portions 3 and 4 of the center section 7 to shaft 80 (FIG. 8). The free ends of the cables 126 are attached to the upper opening 109 in the upstanding arms 102 and 103 on the forward end of the device. Welded or otherwise suitably secured to the inside of the frame members 12 and 13 are stop arms 130 for engagement against stop lugs 131 on the arms 121 for limiting downward movement of the wheels when in transporting position. Secured to the upper edges of the arms 121 are brackets 132 for receiving one end of a coil spring 133, the other end of which is secured in an opening 134 in the side members 12 and 13 to provide spring tension on the arms 121 to prevent excessive bumping when the wheels contact uneven ground, rocks or the like. The stop lug and arm limits movement of the wheels rearwardly with respect to the frame, as illustrated in FIG. 2.

A plate 136 having inturned flanges 137 for engaging the flange 138 on the H-beam of the tongue 91 is slidably mounted on said flange by set screws or the like 139. The plate has an upstanding bracket 140 provided with an opening to receive a pin 141 for mounting a hydraulic cylinder 142 having a rod 143 having its outer end adjustably connected by pin 144 in the openings 109 in the upstanding bracket arms 102 and 103. The cylinder has a fluid connection 145 leading to the hydraulic system of the tractor, as indicated in FIG. 3. By operation of the cylinder the piston rod 143 will be extended as illustrated in FIG. 2 to move the arms 102 and 103 forwardly due to their rotatable mounting in bearings 100, and will exert a pull on the cables 126 running on each side of the frame which operate over the pulleys 128 and 127 to cause the wheels 115 and 116 to contact the ground and raise the rear frame portion of the leveler entirely from the ground. Further movement of the bracket arms 102 and 103 forwardly will cause the roller 107 to engage lower portion of an adjustable ram member 146 on the tongue 91, as best illustrated in FIG. 5. The ramp member is provided at an angle 147 extending upwardly and forwardly of the tongue 91. A continued forward force on the arms 102 and 103 by piston rod 143 will cause the roller 107 between arms 104 and 105 to slide upwardly on ram 146, thus raising the forward frame portion of the leveler with gauge wheels 27 and 28 mounted thereon from the ground until the lower portion 148 of the tongue 91 engages shaft 101 on leveling member 21, and thus lock the parts in position for travel so that the tongue will not "flop" or be in a loose position during such travel, as shown in FIGS. 2 and 5. In this position the stop lugs 131 on arms 121 carrying the transport wheels 115 and 116 have engaged the stop arms 130 to further add rigidity to the structure for transportation.

In operation of a device constructed and assembled as described the vehicle may be transported to a place of use when the wheels 115 and 116 are in down position, and when the field or place of leveling of the ground is reached the wheels are raised by operation of the hydraulic cylinder to retract the piston rod 143 and thus release the tongue from the locking position between roller 107 and shaft 101. The forward crossbar or float member 21 is adjusted with respect to the ground by manipulation of the rods 39 to adjust the wheels 27 and 28. It will be obvious that the wheels are behind the bar so that they will not interfere with the bar in moving the dirt in front thereof. Any tracks caused by the wheels 27 and 28 will be obliterated by the scraper blade 75, and the scraper blade is also adjustable vertically with respect to the frame depending upon the depth it will be required to run to provide a smooth surface by manipulation of the upstanding rods 82 and 83 on each side of the frame, and the rear leveling bar or float 54 is also adjustable with respect to the rear wheels 51 and 52 by manipulation of the rods 64. The tracks made by the wheels 51 and 52 will be obliterated by the rear bar 54 so that after the leveler is moved over the ground no tracks will be showing and the ground will be leveled without leaving ridges on either side of the vehicle due to the plates 76 on the ends of the blade 75.

If it is desired to transport the leveler on a truck or the like the sections of the frame may be taken apart by the loosening of the bolts 11 on the respective flanges 9 and 10 of the sections so that the vehicle may be loaded on the truck. It will be obvious that it will be necessary to disengage the cables from the front section when the sections are to be separated as well as the tongue may be disengaged from the center section by removal of the bolts 97 from the flanges 96 which connect the tongue to the side frame.

It will be obvious from the foregoing that I have provided an improved land leveler wherein the tongue is floating so that the ground engaging level bars and blade will not be affected by the tractor moving over uneven ground. The frame and ground engaging bars and blade are entirely free due to the floating action of the tongue with respect thereto.

What I claim and desire to secure by Letters Patent is:

1. A land leveler for attachment to the draw bar of a tractor comprising, a frame having elongated side members, front and rear wheels supporting said frame at the respective ends thereof, land leveling means carried by the front and rear ends of said side members forwardly of the front wheels and rearwardly of the rear wheels, a scraper blade carried by the frame at substantially the longitudinal center thereof, a tongue having a clevis on its forward end for attaching the leveler to said draw bar, and means pivotally connecting the rear end of the tongue to said side members substantially rearwardly of the front land leveling means whereby said tongue floats free of said front land leveling means when the leveler is moved over the land.

2. A ground leveler for attachment to a draw bar of a tractor comprising, a frame having elongated side members and front and rear cross members, ground engaging bars carried by said front and rear cross members, ground engaging front and rear wheels for said frame, said bars extending transversely of said frame forwardly of the front wheels and rearwardly of the rear wheels, means connecting the front wheels for rotation transversely to said frame, means mounted on the front cross member for adjusting the front wheels vertically with respect to the front ground engaging bar, means mounted on the rear cross member of the frame for adjusting the rear wheels with respect to the rear ground engaging bar, a scraper blade carried by said frame intermediate the ends thereof, a tongue having front and rear ends, means for connecting the front end to the draw bar of the tractor, and means pivotally connecting the rear end of the tongue to said side members substantially rearwardly of the front ground engaging bar and forwardly of said scraper blade whereby the tongue floats free vertically of the front of the frame.

3. A ground leveler for attachment to a draw bar of a tractor comprising, a frame having elongated side members, cross members connecting said side members at their front and rear ends, ground engaging bars connected to said cross members, ground engaging front and rear wheels for said frame, means connecting the front wheels to and rearwardly of the front cross member for rotation transversely to said frame, means carried by the front crossbar for adjusting the front wheels vertically with respect to the front ground engaging bar, means carried by the rear of the frame for adjusting the rear wheels with respect to the rear ground engaging bar, a scraper blade carried by said frame intermediate the ends thereof, means carried by the frame for adjusting said scraper blade vertically with respect to the frame, a tongue having front and rear ends, means for connecting the front end to the draw bar of the tractor, a cross bar rigidly connected to the rear end of the tongue and sleeve bearing means pivotally connecting the ends of said cross bar to said slide members substantially rearwardly of the front ground engaging bar and forwardly of said scraper blade whereby the tongue floats free of the front of the frame.

4. A ground leveler for attachment to a draw bar of a tractor comprising, a frame having elongated side members, cross members connecting said side members at their front and rear ends, ground engaging bars connected to said cross members, ground engaging front and rear wheels for said frame, means connecting the front wheels to the cross members for rotation transversely to said frame, means carried by the front crossbar for adjusting the front wheels vertically with respect to the front ground engaging bar, means carried by the rear of the frame for adjusting the rear wheels with respect to the rear ground engaging bar, a scraper blade carried by said frame intermediate the ends thereof, means carried by the frame for adjusting said scraper blade vertically with respect to the frame, a shaft rotatably mounted on the front cross member intermediate the ends thereof, spaced brackets rigidly secured to said shaft, a pair of transporting wheels, means mounting said wheels on the frame for vertical movement with respect to said side members rearwardly of said blade, cables having one end attached to the spaced brackets and the other ends to said transporting wheel mounting means, a tongue having front and rear ends, means for connecting the front end to the draw bar of the tractor, and means pivotally connecting the rear end of the tongue to said side members substantially rearwardly of the front ground engaging bar whereby the tongue floats free of the front of the frame, and means connecting to said tongue and to the upper end of said brackets to move said brackets forwardly to pull said cables to lower the transporting wheels to the ground and raise said frame for transporting said leveler.

5. A ground leveler for attachment to the raw bar of a tractor comprising, a wheel supported frame having elongated side members and front and rear cross members, ground engaging and leveling means carried by the front and rear cross members, a tongue having means on its forward end for attaching the leveler to said draw bar, and means pivotally connecting the rear end of the tongue to said side members substantially rearwardly of the front ground engaging means whereby said tongue floats free of said front ground leveling means when the leveler is moved over the ground, a shaft rotatably mounted on the front cross member intermediate the ends thereof, upwardly extending spaced brackets rigidly mounted on said shaft, said tongue extending between said brackets, a pair of transporting wheels, means mounting said wheels on said frame for vertical movement with respect to the frame, cable means connected to said transportating wheel mounting means and the upper ends of said brackets, and hydraulic means connected to said tongue and said brackets for rotating said brackets forwardly to lower said transporting wheels to the ground and raise said frame for transporting said leveler.

6. A ground leveler for attachment to the draw bar of a tractor comprising, a wheel supported frame having elongated side members and front and rear cross members, ground engaging and leveling means carried by the front and rear cross members, a tongue having means on its forward end for attaching the leveler to said draw bar, and means pivotally connecting the rear end of the tongue to said side members substantially rearwardly of the front ground engaging means whereby said tongue floats free of said front ground leveling means when the leveler is moved over the ground, a shaft rotatably mounted on the front ground leveling means intermediate the ends thereof, upwardly extending spaced brackets rigidly mounted on said shaft, said tongue extending between said brackets, a pair of transporting wheels, means mounting said wheels on said frame for vertical movement with respect to the frame, cable means connected to said transporting wheel mounting means and the upper ends of said brackets, hydraulic means connected to said tongue and said brackets for rotating said brackets forwardly to lower said transporting wheels to the ground and raise said frame for transporting said leveler, said brackets having forwardly extending arms, a roller mounted on said last-named arms, and means on said tongue forwardly of said brackets for engaging said roller to move the tongue against the shaft on the front ground leveling means to lock said tongue when the leveler is being transported.

7. A land leveler for attachment to the draw bar of a tractor comprising, a wheel supported frame having elongated side members and front and rear cross members, land leveling means carried by the front and rear cross members of said frame, a tongue having a clevis on its forward end for attaching the leveler to said draw bar, means pivotally connecting the rear end of the tongue to said side members substantially rearwardly of the front land leveling means, a shaft mounted on the front cross member, and vertical guide means carried by said shaft, said tongue extending through said guide means to limit transverse movement of said tongue with respect to said frame.

References Cited in the file of this patent

UNITED STATES PATENTS

| | | |
|---|---|---|
| 1,253,184 | Keller | Jan. 8, 1918 |
| 1,945,518 | Carlson | Feb. 6, 1934 |
| 2,881,540 | Sprague | Apr. 14, 1959 |
| 2,886,906 | Moses | May 19, 1959 |